UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER AND THE PREPARATION THEREOF.

1,113,970.  Specification of Letters Patent.  Patented Oct. 20, 1914.

No Drawing.  Application filed February 18, 1907. Serial No. 358,101.

*To all whom it may concern:*

Be it known that I, CARLETON ELLIS, of White Plains, in the county of Westchester and State of New York, have made certain new and useful Inventions Relating to Paint or Varnish Removers and the Preparation Thereof, of which the following is a specification.

This invention relates to paint or varnish removers and the process of making the same and relates especially to removers of a generally ketonic character especially desirable for the removal of shellac and other varnish coatings.

In the manufacture of acetone, calcium acetate is generally employed as a raw material and the commercial processes produce a considerable proportion of oily body as well as the acetone desired. This oily material may be separated from the acetone by agitation with water which absorbs the acetone and similar water-soluble ketones, leaving the other materials in a separated condition. This residual oily material comprises pinacolins and condensation products of the higher ketones. This material may be deodorized, that is, deprived of its disagreeable odor to a considerable extent when used for removers by treatment with metallic sodium or similar material which seems to combine with these substances to form polymeric bodies which are solid at ordinary temperatures and which may be more readily separated from the liquid components by distillation. Metallic sodium also seems to reduce certain unsaturated compounds by virtue of the nascent hydrogen which is liberated when the metal comes in contact with these organic bodies. The saturated bodies resulting have very much less odor than the unsaturated bodies from which they are formed. After this deodorizing process and distillation of the treated material the ketonic condensation products comprising pinacolins and allied bodies may be used in preparing paint or varnish removers either alone or in conjunction with other alcoholic or ketonic bodies and in connection with benzol, its homologues or other wax solvents, it being understood, of course, that stiffening materials, such as wax, wood flour, whiting, infusorial earth and the like may also be used to increase the consistency of the compound.

An illustrative remover of this character may be prepared according to the following formula: Higher ketonic condensation products, preferably deodorized as indicated, 10 parts, chlor benzol 5 parts, benzol 3 parts, light kerosene 2 parts, ceresin wax or similar waxy bodies, 1 part, wood flour 7 parts. Another illustrative remover of this character may contain higher ketonic condensation products, such as the pinacolins derived from acetone as described, 12 parts, benzol 3 parts, ceresin wax 1 part. Still another illustrative remover which may be used, if desired, for dipping or tank work may contain higher ketone condensation products 15 parts, kerosene, about 120°, 6 parts, paraffin wax, if desired, ½ part. It is, of course, understood that the proportions of the stiffening material may be varied considerably according to the class of work in which the remover is to be used, and it is not necessary in all cases to use the wax or other stiffening material. Furthermore, the benzol and other wax solvent ingredients may in some cases be omitted, for instance, where the remover is intended solely for use on varnish coatings.

This invention has been described in connection with a number of illustrative ingredients, formulas, proportions and processes, to the details of which disclosure the invention is not, of course, to be limited.

What is claimed is:—

1. The paint or varnish remover comprising approximately water insoluble higher ketonic condensation products 10 parts, chlor benzol 5 parts, benzol 3 parts, kerosene 2 parts, ceresin wax 1 part, and wood flour 7 parts.

2. The paint or varnish remover comprising approximately higher ketonic condensation products 10 parts, organic wax solvents 10 parts, wax 1 part and stiffening material 7 parts.

3. The paint or varnish remover comprising approximately water insoluble higher ketonic condensation products 10 parts, hydrocarbon wax solvents 10 parts and stiffening material, including wax bodies.

4. The paint or varnish remover comprising higher ketonic condensation products, hydrocarbon wax solvents including benzol and stiffening material, including a waxy body.

5. The paint or varnish remover comprising a considerable proportion of substantially saturated higher ketone condensation products including pinacolin, penetrating finish solvent material including benzol and incorporated stiffening material including wax.

6. The paint or varnish remover comprising a considerable proportion of substantially saturated water insoluble higher ketone condensation products including pinacolin and incorporated benzol and stiffening material.

7. The paint or varnish remover comprising a considerable proportion of deodorized ketone condensation products, miscible finish solvent material including benzol and incorporated waxy stiffening material.

8. The paint or varnish remover comprising approximately water insoluble higher ketonic condensation products including pinacolin 10 parts, chlor benzol 5 parts, benzol 3 parts, kerosene 2 parts, ceresin wax 1 part and wood flour 7 parts.

9. The paint or varnish remover comprising higher ketonic condensation products including pinacolin 10 parts, organic wax solvent material 10 parts and stiffening material including wax 8 parts.

10. The paint or varnish remover comprising approximately water insoluble higher ketonic condensation products including pinacolin 10 parts, hydrocarbon wax solvent material 10 parts and stiffening material including a waxy body.

11. The paint or varnish remover comprising ketonic condensation products substantially free from objectionable odor, other paint or varnish softening material and stiffening material including a waxy body.

12. The paint or varnish remover comprising higher ketonic condensation products substantially free from objectionable odor, other paint or varnish softening material and evaporation retarding stiffening material.

13. The paint or varnish remover comprising deodorized higher ketonic condensation products including pinacolin and evaporation retarding stiffening material.

14. The paint or varnish remover comprising deodorized ketone condensation products including pinacolin, other organic paint or varnish solvent material including benzol and waxy stiffening material.

15. The finish remover comprising finish solvent material including deodorized pinacolin and evaporation retarding stiffening material.

16. The substantially fluent finish remover comprising finish solvent material including pinacolin, aromatic finish solvent material and incorporated stiffening material.

17. The substantially fluent finish remover comprising substantially saturated water-insoluble higher ketone condensation products including pinacolin and incorporated stiffening material.

18. The finish remover comprising ketone condensation products including pinacolin which are substantially free from objectionable odor, incorporated miscible finish solvent material including aromatic solvent and stiffening material.

19. The finish remover comprising ketone condensation products which are substantially free from objectionable odor, incorporated miscible finish solvent material including aromatic solvent and stiffening material.

20. The paint or varnish remover comprising penetrating finish solvent material including benzol, incorporated stiffening material including wax, and a considerable proportion of deodorized substantially saturated higher ketone condensation products including pinacolin incidentally produceable in the manufacture of acetone from calcium acetate.

21. The paint or varnish remover comprising finish solvent material including aromatic solvent stiffening material and a considerable proportion of ketone condensation products incidentally produceable in the manufacture of acetone from calcium acetate.

22. The finish remover comprising finish solvent material including a penetrating finish solvent, stiffening material and a considerable proportion of oily higher ketone condensation products incidentally produceable in the manufacture of acetone from calcium acetate and substantially freed from objectionable odor.

CARLETON ELLIS.

Witnesses:
JESSIE B. KAY,
HARRY L. DUNCAN.